C. O. EKVALL.
ENVELOP MACHINE.
APPLICATION FILED JUNE 30, 1916.

1,254,666.

Patented Jan. 29, 1918.
12 SHEETS—SHEET 2.

Witnesses:

Inventor
Carl O. Ekvall
By his Attorney

C. O. EKVALL.
ENVELOP MACHINE.
APPLICATION FILED JUNE 30, 1916.

1,254,666.

Patented Jan. 29, 1918.
12 SHEETS—SHEET 3.

Witnesses:

Inventor
Carl O. Ekvall.
By his Attorney

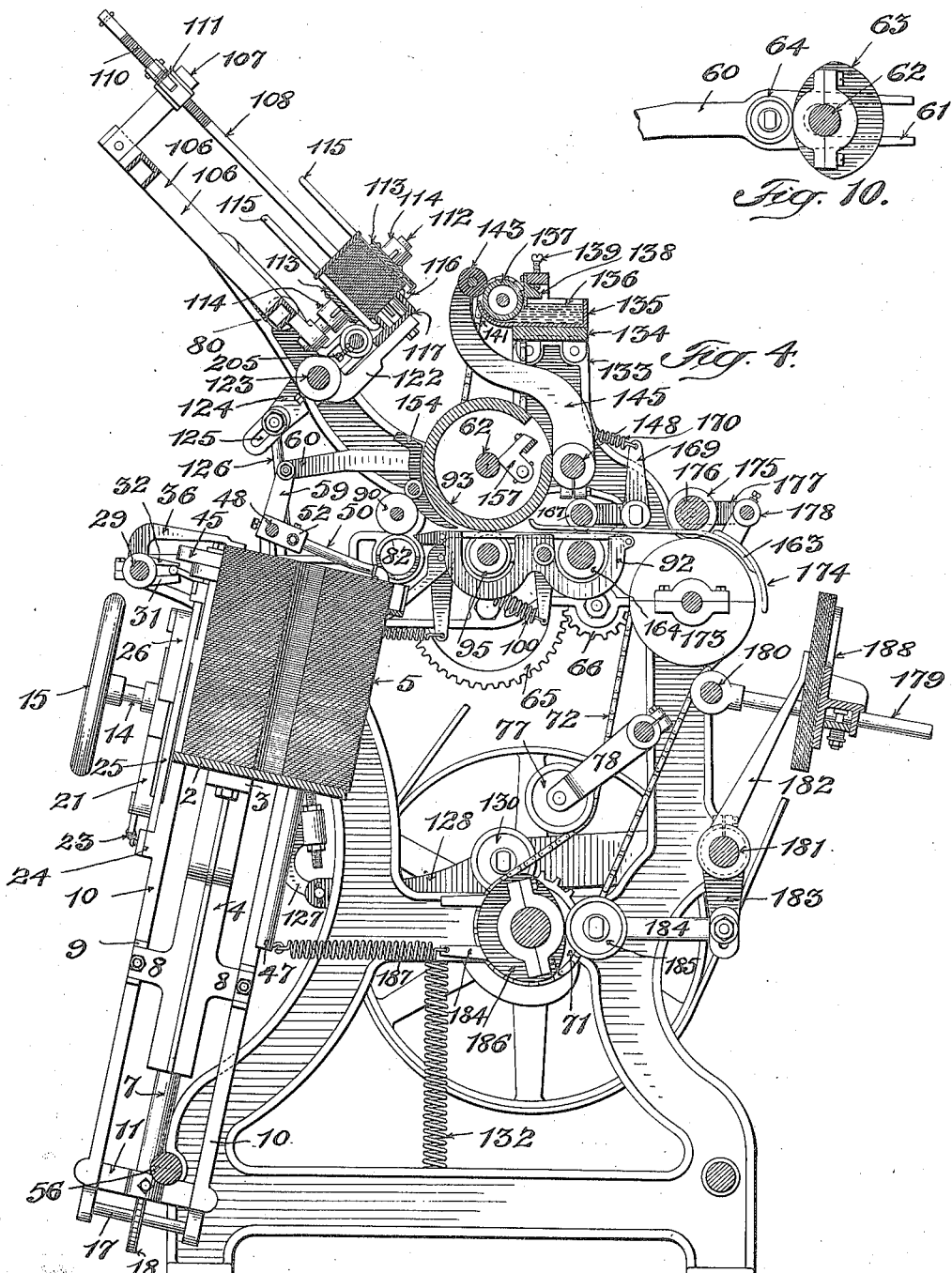

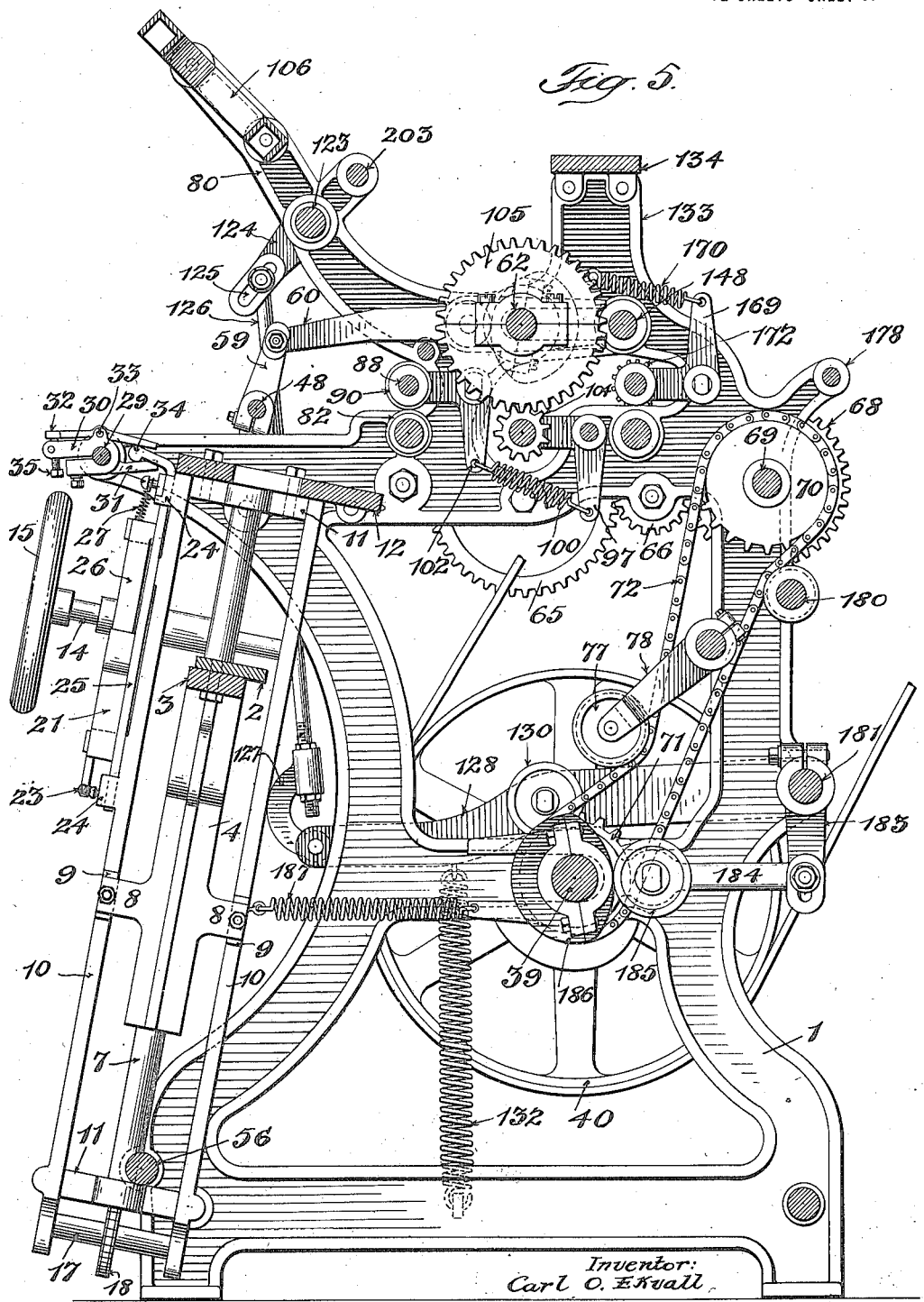

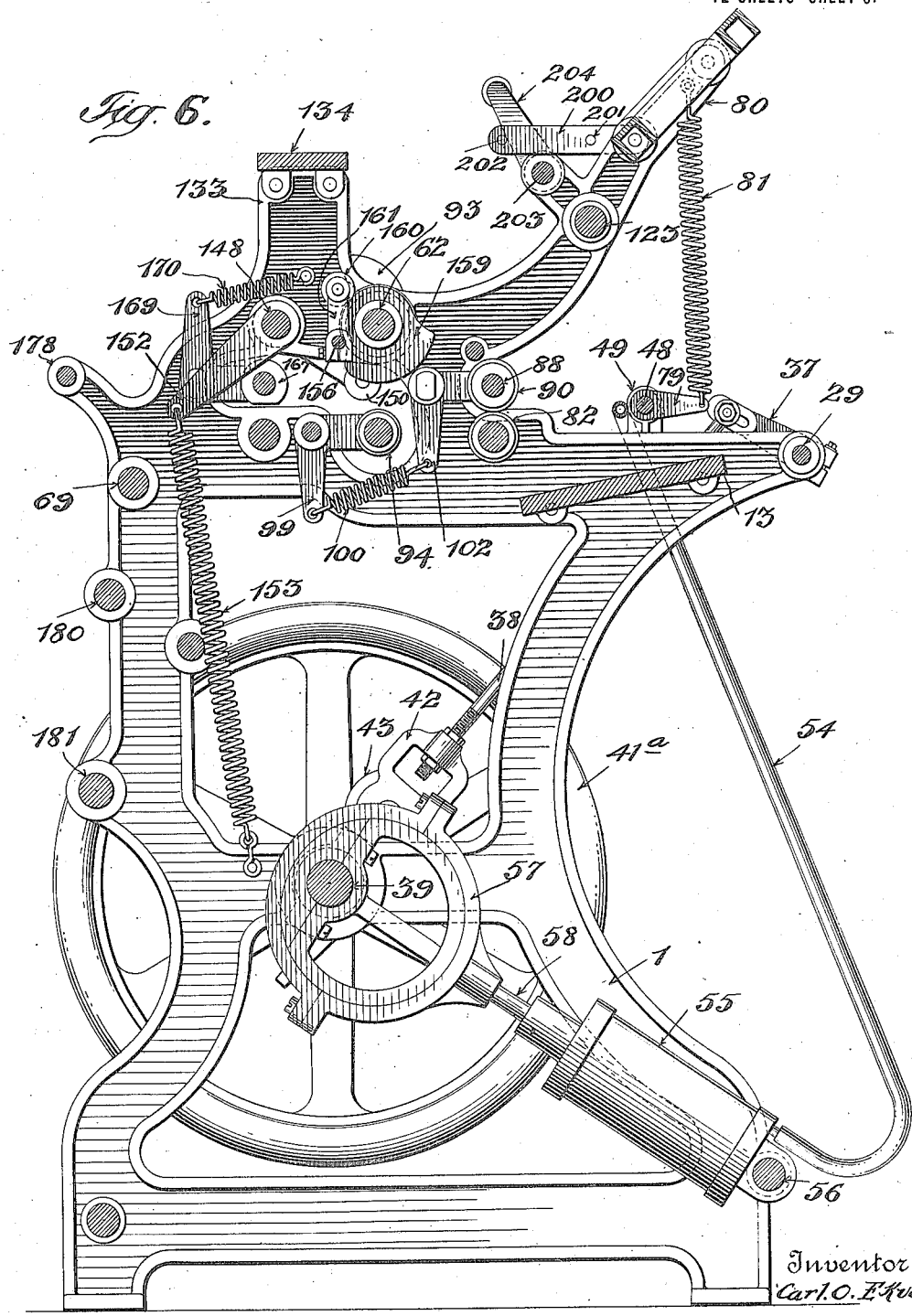

C. O. EKVALL.
ENVELOP MACHINE.
APPLICATION FILED JUNE 30, 1916.

1,254,666.

Patented Jan. 29, 1918.
12 SHEETS—SHEET 7.

Witnesses:

Inventor
Carl O. Ekvall
By his Attorney

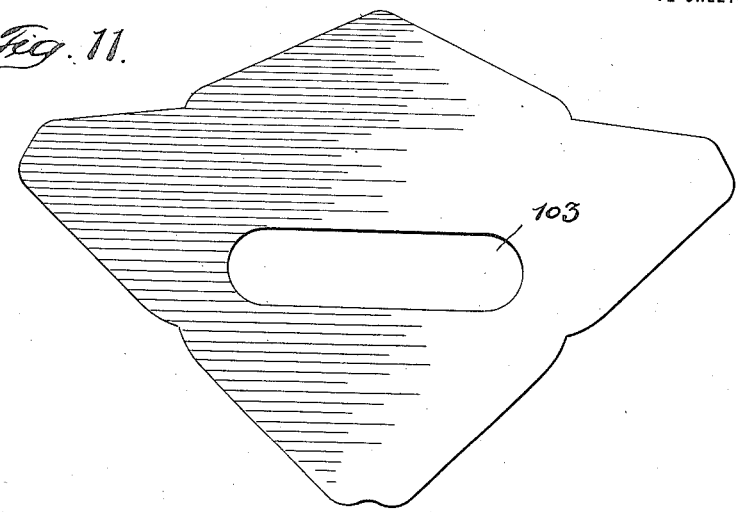
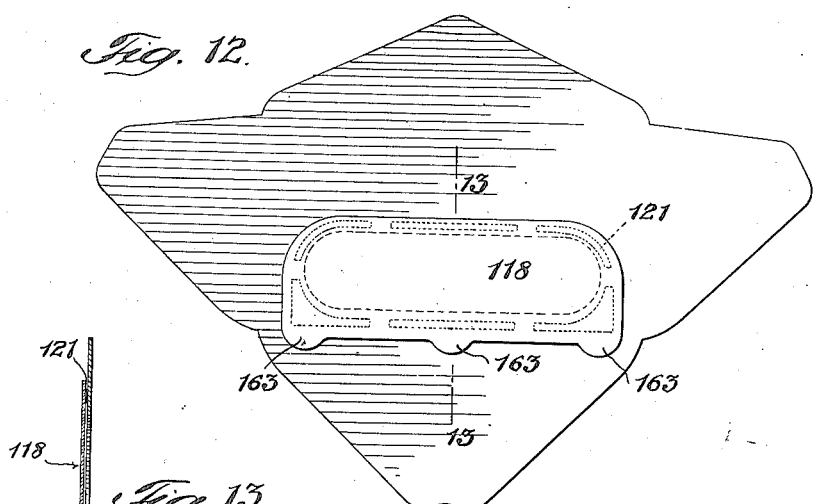
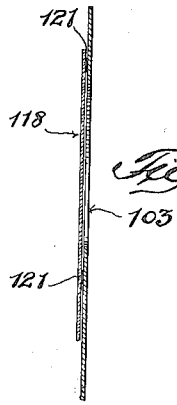
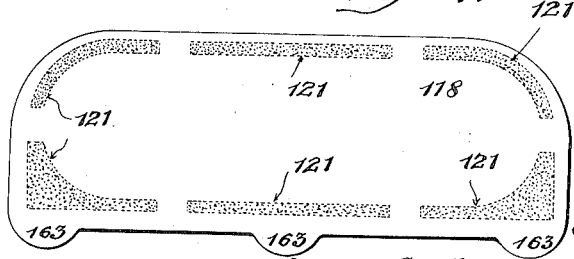

C. O. EKVALL.
ENVELOP MACHINE.
APPLICATION FILED JUNE 30, 1916.

1,254,666.

Patented Jan. 29, 1918.
12 SHEETS—SHEET 9.

INVENTOR
Carl O. F. Kvall
BY
HIS ATTORNEY

WITNESSES

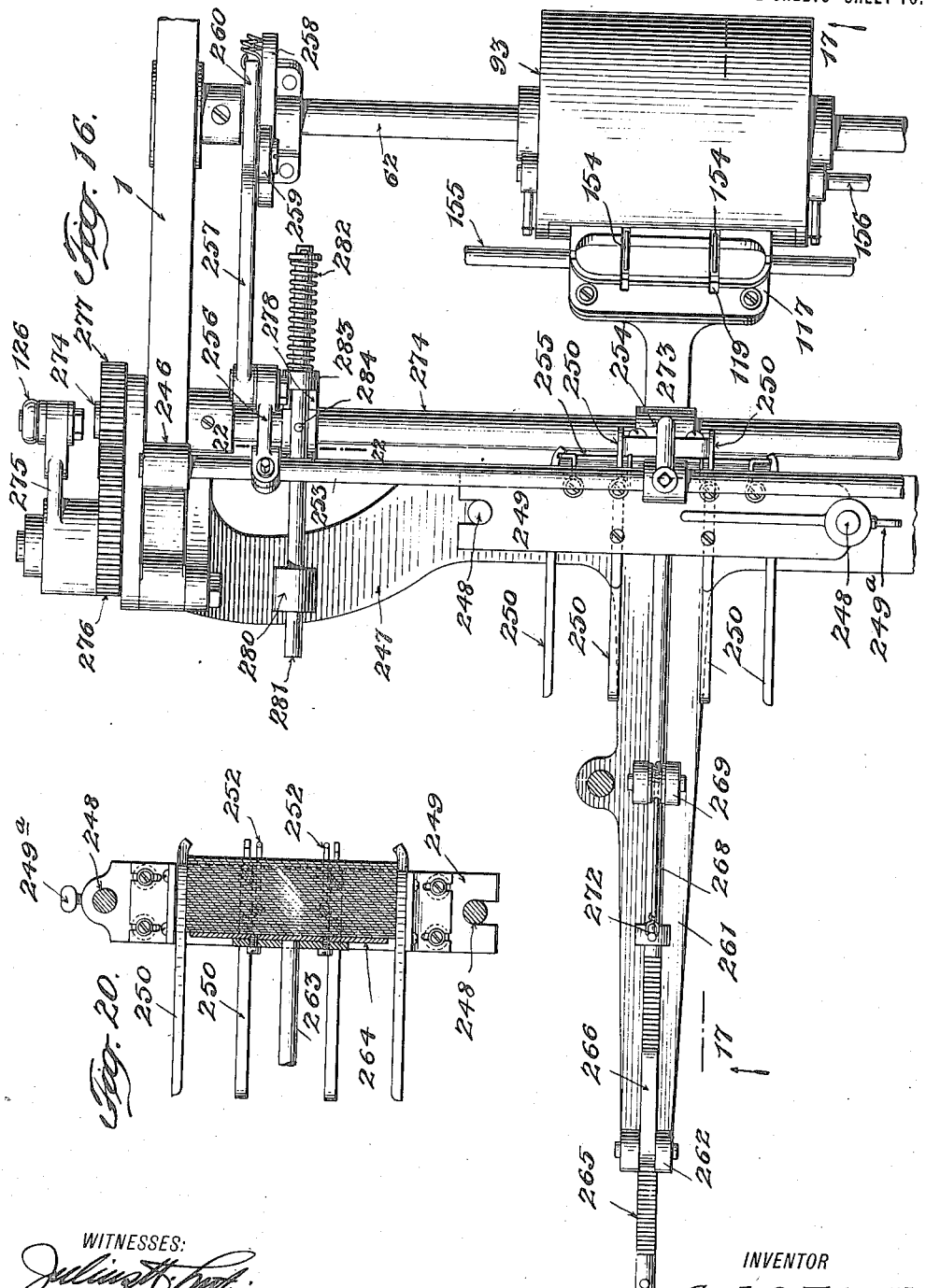

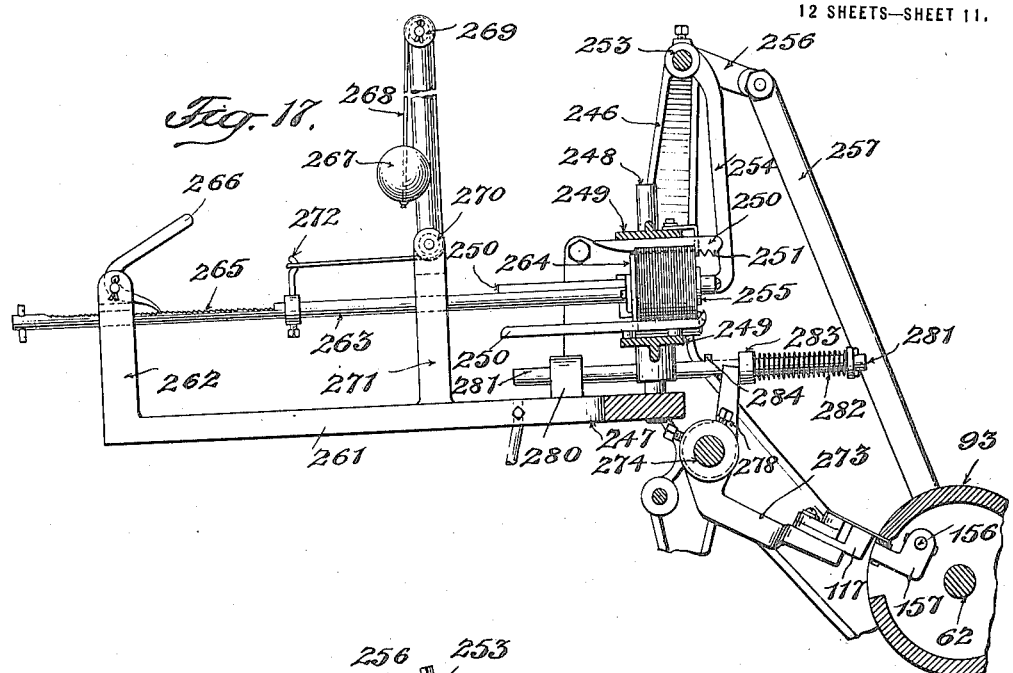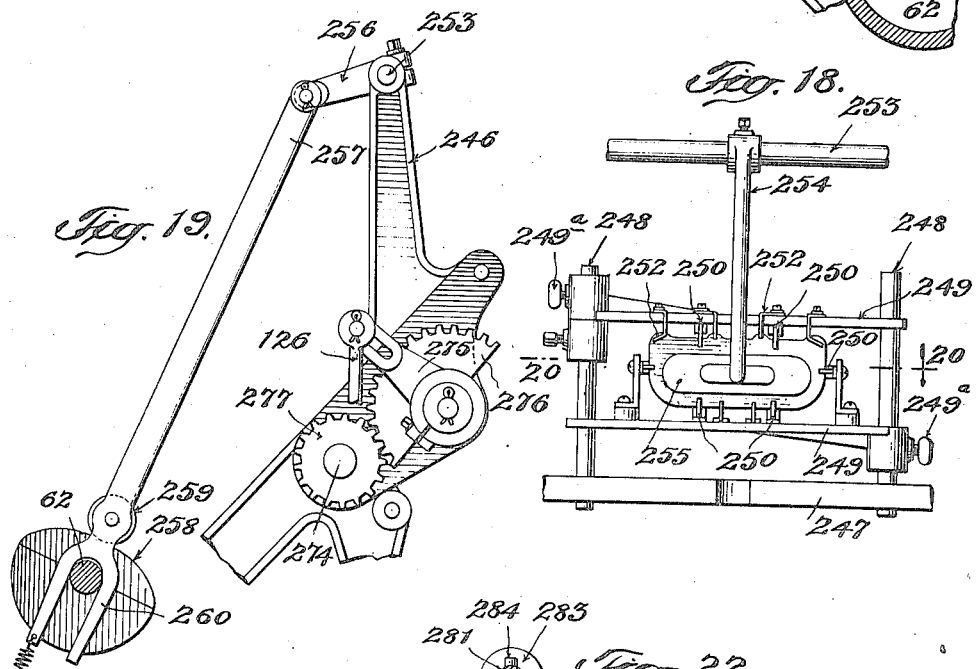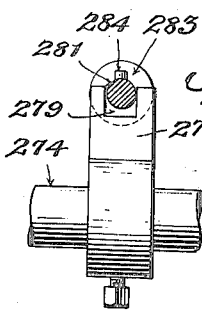

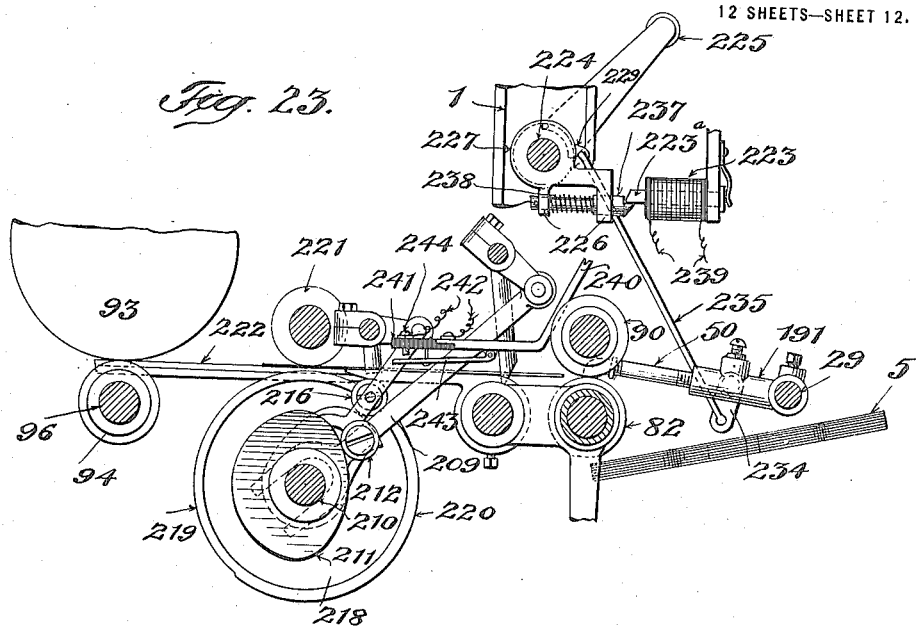
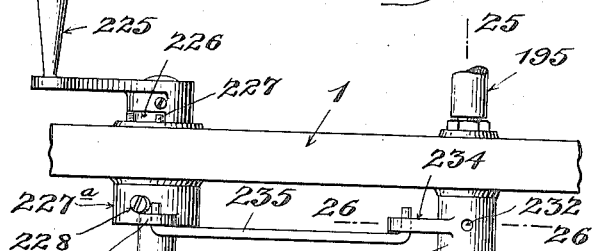
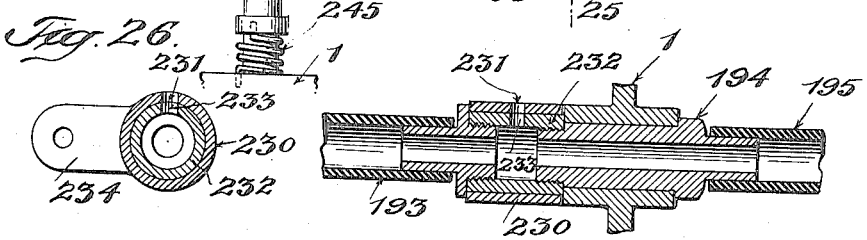

UNITED STATES PATENT OFFICE.

CARL O. EKVALL, OF NEW YORK, N. Y., ASSIGNOR TO GENERAL PAPER GOODS MANUFACTURING CO., OF NEW YORK, N. Y., A CORPORATION OF NEW YORK.

ENVELOP-MACHINE.

1,254,666.

Specification of Letters Patent. Patented Jan. 29, 1918.

Application filed June 30, 1916. Serial No. 106,763.

*To all whom it may concern:*

Be it known that I, CARL O. EKVALL, a citizen of the United States, and a resident of the city of New York, county of Kings, and State of New York, have invented certain new and useful Improvements in Envelop-Machines, of which the following is a specification.

This invention relates to a machine for manufacturing envelops, and especially to that type of envelop known as the "outlook" envelop which type of envelop is generally formed of opaque material, the front of which has an opening over which is secured a strip or patch of transparent paper through which the address written on the letter contained within the envelop can be seen.

The object of this invention is to provide a machine for applying the transparent strips or patches to the envelop blanks, which will be positive and certain in its operation.

These and other objects are accomplished by my invention, a more particular description of which will appear below.

Reference is to be had to the accompanying drawings annexed hereto, and forming part of this application, in which—

Fig. 3 is a transverse sectional elevation of the machine on the line 3—3 of Fig. 1, looking in the direction of the arrows;

Fig. 4 is a vertical sectional view of the machine on the line 4—4 of Fig. 3, looking in the direction of the arrows;

Fig. 6 is a vertical sectional view of the machine on the line 6—6 of Fig. 3, looking in the direction of the arrows;

Fig. 9 is a plan view of the gumming die and patch carrier;

Fig. 10 is a side elevation, partly in section, of the cam mechanism for actuating the envelop blank lifter;

Fig. 11 is a face view of an envelop blank before the patch has been applied by the machine;

Fig. 12 is a face view of the envelop blank showing the patch applied;

Fig. 13 is a sectional view on the line 13—13 of Fig. 12;

Fig. 14 is a face view of the transparent patch;

Fig. 16 is a plan view of a modified form of patch holding mechanism, gumming die and actuating mechanism for the same;

Fig. 17 is a sectional view on the line 17—17 of Fig. 16, looking in the direction of the arrows;

Fig. 18 is a front elevation of a modified form of patch holding device;

Fig. 19 is a side elevation of a portion of the machine showing a modified mechanism for actuating the gumming die;

Fig. 20 is a sectional view on the line 20—20 of Fig. 18, looking in the direction of the arrows;

Fig. 22 is a sectional view on the line 22—22 of Fig. 16, looking in the direction of the arrows;

Fig. 23 is a vertical sectional view of the modified mechanism;

Fig. 24 is a plan view of the mechanism for shutting off the air supply to the patch lifting tube;

Fig. 25 is a sectional view on the line 25—25 of Fig. 24; and

Fig. 26 is a sectional view on the line 26—26 of Fig. 24.

Throughout the various views of the drawings, similar reference characters indicate corresponding parts.

Figure 1:
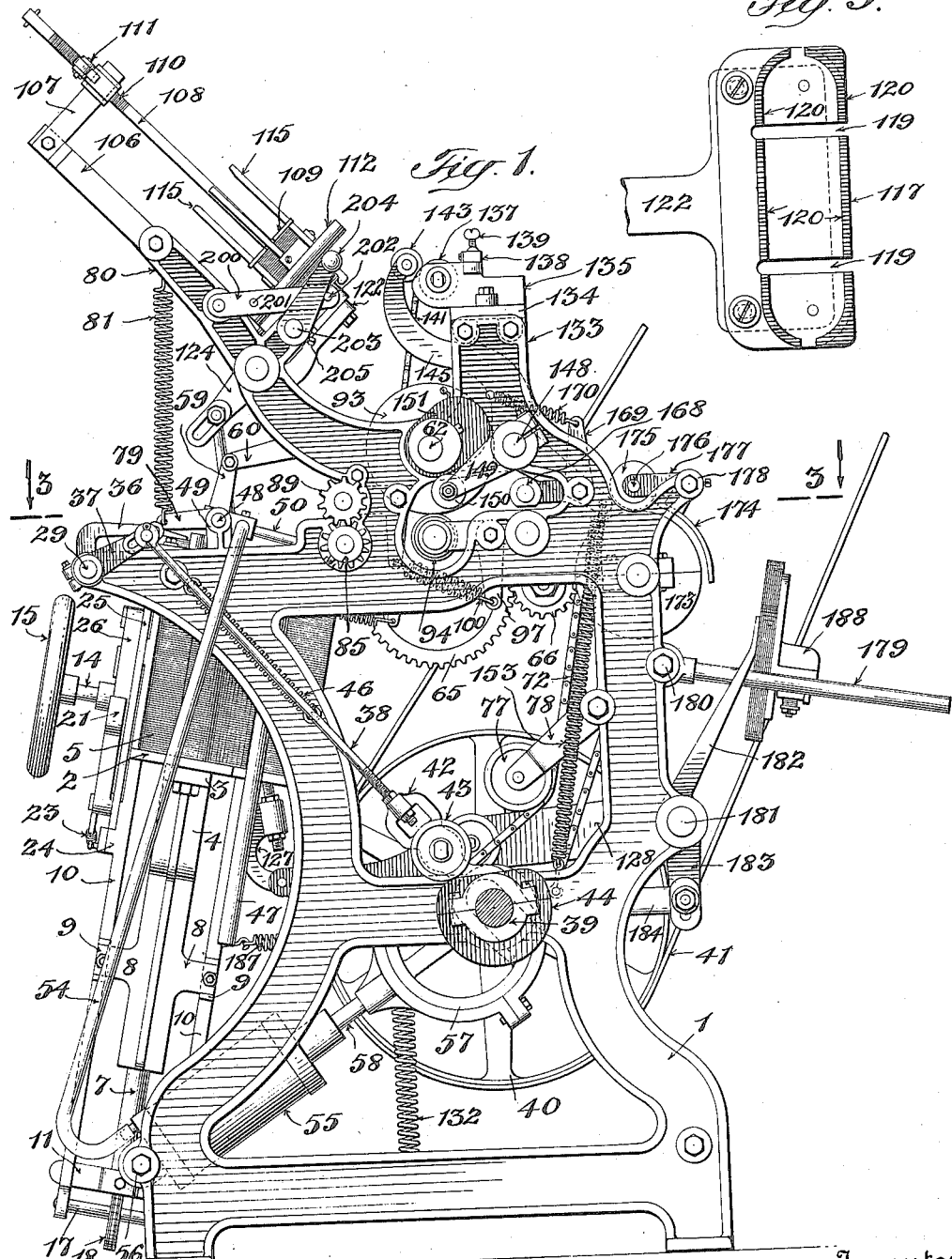
Figure 1 is a side elevation of my improved envelop machine, partly in section.

In the preferred embodiment of my invention, as shown in the accompanying drawings, the frame of the machine is provided with two side members 1, suitably connected.

At one end of the machine is situated the envelop blank table 2, which supports the pile of envelop blanks 5, which blanks are, when placed upon this envelop table, of the shape shown in Fig. 11. The blank table 2 is vertically movable as will now be described. Secured to the bottom of the blank table 2, is a bracket 3, which has a downwardly extending arm 4, which arm 4 is provided with a pair of guides 6, which guides move on the downwardly extending rod 7.

The arm 4 is provided with two laterally extending projections 8, the ends of which are provided with adjustable blocks 9, which blocks slide on a pair of parallel guide bars 10, which guide bars are connected at their upper and lower ends by cross members 11, which cross members support the rod 7. The guide bars 10 are secured to the frame of the machine at their lower ends and to a plate 12, which plate is secured to one of the sides 1 of the machine. Another plate 13, of like contour, is secured at the opposite side of the machine, and between these two plates, the blank table 2 is situated.

A rotatable shaft 14 extends through the guide bars 10, adjacent their upper ends and mounted on the outer end of the shaft 14 is a hand wheel 15 for manually raising the envelop blank table in a manner which will be described below. Mounted on the shaft 14 between the guide bars 10 is a sprocket 16. Mounted rotatively between the guide bars 10, adjacent their lower ends, is a rod 17, upon which is mounted a sprocket 18. A chain 19 connects the sprockets 16 and 18, which chain is also secured to one of the guides 6, whereby a rotation of the hand wheel raises or lowers the blank table 2, as may be desired.

Mounted on the shaft 14 is a ratchet wheel 20. A pawl 21 is pivotally mounted on one of the guide bars 10, at 22 and engages the ratchet wheel 20 and is held in such engagement by the spring 23, to prevent backward turning of the ratchet wheel and a descending of the blank table.

On the outer guide bar 10 are formed a pair of guides 24, one directly above the other, and slidably mounted in said guides is a plate 25. A pawl 26 is pivotally mounted on said plate 25 and engages the ratchet wheel 20 and is held in engagement therewith by the spring 27. It will be noted that an upward movement of the plate 25 brings the pawl 26 upward with it, and the pawl 25 being engaged with the ratchet wheel 20 causes said ratchet wheel to rotate, which rotation causes the envelop blank table 2 to ascend. A dog 28 pivotally secured to the outer guide bar 10, is mounted above the pawls 21 and 26 and engages said pawls, and when desired can throw said pawls out of engagement with the ratchet wheel 20 so that a lowering of the envelop blank table can be effected for the purpose of adding more blanks.

Extending transversely of the machine, and connecting the two side members 1 of the frame, is an oscillating shaft 29 and mounted on said shaft is a bracket 30 and mounted on the lower end of said bracket is a finger 31. A finger 32 is pivotally mounted at 33 in the upper side of said bracket. The plate 25 has a turned over upper end which extends between the fingers 31 and 32 so that an oscillation of the shaft 29 upon which the fingers are mounted tends to raise the end of the finger 31 which is under the curved end of the plate 25 and which lifts the plate 25 which thereby raises the blank table 2 through the mechanism heretofore described. A set screw 35, is adjustable vertically in the outer end of the bracket 30 and the end of this set screw, with which the outer end of the finger 32 contacts, limits or restricts the pivoting movement of the finger 32 on the pivot 33 and the plate 25 because of its turned over end 34 being below the finger 32 and adapted to contact therewith cannot be moved upwardly any farther than allowed by the finger 32 the finger 32 forming a stop for such upward movement.

Secured to the shaft 29 so that its free end can rest upon the pile of envelop blanks 5 on the blank table is a finger 36. This finger 36 acts to determine the height of the pile of envelop blanks so that the top blank on the pile will be within the radius of movement of the blank picker or lifter to be described below. The finger 32 is regulated by the set screw 35 so that during the rotation or oscillation of the shaft 29 the finger 36 will contact with the top of the pile of envelop blanks so that the blank lifter will, in its downward pivotal movement, be certain to contact with, and lift the uppermost blank on the pile.

The shaft 29 has fixed on its end, a lever 37, to which is pivotally connected a rod 38, which extends downwardly at an angle to the main shaft 39. The main shaft 39 is provided at one of its ends with a drum 40 which can be driven by a belt 41 or other suitable driving means and which is provided with a clutch 40$^a$. On the other end of the main shaft is a hand wheel 41$^a$. Mounted on the lower end of the rod 38 is a yoke 42 which embraces the main shaft 39 and mounted on said yoke is a roller 43 which rides on a cam 44 secured on the main shaft 39 and which oscillates the shaft 29 through the above mentioned mechanism in the desired manner. A spring 46, secured at one of its ends to the rod 38, and at its other end to the side of the frame 1, holds the roller 43 on the cam 44.

In order that the envelop blanks are held true on the table 2, adjustable guides 45 are secured to the plates 12 and 13, the free ends of these guides being provided with downwardly extending pins 47 to bear against the side of the pile of blanks on the table, the pins on the front guides being longer than those on the rear to prevent the blanks from sliding downward by gravity and off the blank table.

A shaft 48 extends transversely of the machine and is mounted to oscillate in bearings 49 on the sides 1 of the frame, upon which shaft is mounted the blank picker which consists of a tube 50 which has a turned down free outer end to engage the uppermost blank on the pile 5, which is situated directly below it. The picker tube 50 extends longitudinally of the machine and extends into a connection 52, secured on the shaft 48, which connection is hollowed so that air can pass through the same. Extending from the connection 52, at right angles to the picker tube 50 is another tube 53 through which air passes to the tube 50, and extending from the end of this tube 53 is a flexible tube 54, which runs to the base of the machine to a pump 55 which is pivotally mounted on a cross rod 56 extending between the two side members of the machine.

The pump is operated by an eccentric 57 to which the piston rod 58 of the pump is connected, and which is mounted on the main shaft 39 of the machine. It will, therefore, be noted that suction produced through the connecting tubes 50, 53 and 54 by the pump 55 will cause the uppermost blank, upon which the tube 50 rests to adhere to the end 51 of that tube by suction and an upward movement of the tube will cause the front end of the blank, upon which the tube 50 is resting, to rise. When the front end of the blank has been raised sufficient to engage rollers, to be described, the eccentric 57 causes the action of the pump to reverse, and the blank is blown off the end of the picker or lifter tube 50 on the rollers which move it forward in a manner hereinafter described.

The tube 50 and the blank lifted by said tube are caused to rise by oscillating the shaft 48 which is oscillated by mechanism now to be described. A lever 59 is fixed on the shaft 48 and extends upwardly therefrom, and pivotally secured to the upper end of said lever 59 is a lever 60, which lever has a yoke 61 at its outer end embracing a shaft 62, upon which shaft is mounted a cam 63 and upon the yoke 61 is mounted a roller 64 which rides upon the cam to oscillate the shaft 48. The shaft 62 is driven by a gear 73 on one of its ends which meshes with an idle gear 65, which gear 65 meshes with an idle gear 66, and this gear 66 meshes with a gear 68 on a shaft 69 and the shaft 69 has a sprocket 70 mounted on it. A sprocket 71 is secured on the main shaft 39 and the shaft 69 is rotated by a chain 72 connecting the sprockets 70 and 71. An idler 77 on an arm 78 holds the chain 72 taut. A lever 79 is secured on the shaft 48 and extending upwardly from the outer end of this lever 79 to a bracket 80 on the frame is a spring 81 which spring tends to hold the roller 64 against the cam 63.

After the blank has been lifted and released from the picker or lifter tube 50, it falls on a split roller 82 mounted on the shaft 51. This split roller 82 is split transversely so that the tube 50 can, on its upward movement, pass between the two halves of the roller 82. It will therefore be noted that the shaft 51 is divided into two parts, which parts are supported at their outer ends by the side members of the frame, and adjacent their inner ends by brackets 83 having bearings 84 in which the shaft 51 revolves. On each end of the shaft 51 are secured gears 85, one of the gears 85 on one end of the shaft 51 being driven by an idle gear 86 through the idle gear 65, which gear 65 is driven from the main shaft in a manner heretofore described. The gear 85 driven by the gear 86 drives another gear 87 situated above it and mounted on a shaft 88, which shaft 88 extends across the machine and has a gear 89 on its end which gear 89 meshes with the gear 85 on the other half of the shaft 51.

The blank is lifted by the tube 50 and its front end falls on the cut away portion of the split roller 82. As this split roller continues its revolving, the blank is grasped between the semi-circular portion of this roller 82 and a sectional roller 90 directly above the split roller 82 in the manner shown in Fig. 7. Between these two rollers the blank is moved forward on a plate or bar 91 which is mounted in curved brackets 92, between the large patch applying roller 93, which is mounted on the shaft 62, and the pressing roller 94.

The pressing roller 94 comprises a series of small rollers 95, carried on a shaft 96 which shaft 96 is supported at one of its ends by a bell crank lever 97 and at its other end by a bell crank lever 99, both bell crank levers 97 and 99 being mounted on a cross rod 101, one arm of each bell crank lever having springs 100 extending to another pair of bell crank levers 102 which support the shaft 88.

Mounted on the shaft 96 is a gear 104, which gear meshes with a gear 105 on the shaft 62 and which drives the shaft 96.

When the blank reaches the point between the roller 93 and the pressing roller 94, the patch has been pressed upon the envelop blank and over the opening 103 therein in a manner to be described.

*Patch applying mechanism.*

Mounted between the upwardly extending brackets 80 on the side members of the frame is a frame 106 which has an outwardly extending arm 107 at its outer end and slidable through the outer end of the arm 107 is a rod 108, the lower end of which is provided with a head 109, which head bears downwardly by gravity, against the rear of the patches in the holder. The outer portion of the rod 108 is toothed, as at 110 and a dog 111, pivotally mounted in the end of the arm 107, engages the toothed portion 110 and prevents backward movement of the rod 108 and its attached head 109 resting upon the patches, when the pile of patches is pressed against the gumming die and patch remover.

The patch holder is supported by a pair of rods 112, between which extend plates 113, which plates 113 are secured on sleeves 114, which sleeves are movable on the rods 112. Plates 117ª are secured at the outer ends of the plates 113 and extend downward at the sides of the pile of patches. Between the plates 113 and 117 and the pile of patches are a plurality of guides 115 which guides have their front ends turned down as at 116 confining the patches within said ends so that the front patch in the holder to be removed must be removed with force, and said down-turned ends also tend to separate any patches which may inadvertently adhere to the rear of the gummed patch.

The gumming die 117, acts as a die for gumming the patch 118 whereby said patch adheres to the blank over the opening 103 therein, and also removes the patches, one at a time, from the patch holder, and presents them to the gripping holder 93 which transfers them to the blank. The die 117 is provided with a pair of transverse slots 119 and an upwardly projecting wall 120 upon which the gum adheres and forms the impression on the patch as indicated at 121 in Fig. 14.

The die 117 is mounted on an arm 122 which is secured to an oscillating shaft 123 extending across the frame, and to one end of this shaft is secured a lever 124, and pivotally secured to the end of said lever 124, which is slotted at 125 to allow of adjustment, is a downwardly extending rod 126, which is secured at its lower end to a curved lever 127, which lever 127 is pivotally secured at its lower end to a lever 128. The lever 128 is pivotally secured at its front end at 129 to the frame and rotatively mounted on the lever 128 is a roller 130 which rides on a cam 131 mounted on the main shaft and which oscillates the shaft 123 through the mechanism above described. A spring, 132, secured at its upper end to the lever 128, and at its lower end to the frame holds the roller 130 resiliently on the cam 131.

I have heretofore mentioned that gum is applied to the die 117 which gums the patch and removes the same from the holder simultaneously. Gum is placed on the die 117 by the following mechanism:—

Mounted on the upwardly extending brackets 133 on each side of the frame, is a cross plate 134 and mounted on top of said plate is the gum box 135 which contains the gum 136. Rotatably mounted in said gum box is a gum distributing roller 137. A plate 138 extends across the gum box 135 for the purpose of distributing the gum evenly on the surface of the distributing roller 137 and this plate is adjustable by the set screws 139 to increase or decrease the amount of gum to be applied to the roller's surface. The roller 137 has a sprocket 140 secured on one of the ends of the shaft on which it is mounted and this sprocket is rotated by a chain 141 driven from a sprocket 142 mounted on the shaft 62.

A roller 143 is used to transfer the gum from the roller 137 and this roller 143 is mounted on a rotatable shaft 144 which is mounted in arms 145. A gear 146 is secured on the shaft 144, which gear meshes with a gear 147 secured on the shaft upon which the roller 137 is mounted so that when the roller 143 rests upon the roller 137 and the gears mesh, the rollers rotate whereby gum from the roller 137 is thoroughly applied on the surface of the roller 143.

The arms 145 are secured on an oscillating shaft 148, and secured to this shaft at one of its ends is an arm 149, and mounted on the outer or free end of the arm 149 is a roller 150 which rides upon a cam 151 mounted on the shaft 62. An arm 152 is also secured on the shaft 148 and a spring 153 extends downwardly from the end of the arm 152 to the frame where it is secured, to hold the roller 150 against the cam 151 and to bring the roller 143 back against the roller 137 after it has been swung backward to gum the surface of the die 117.

In gumming the die 117, the arms 145 carrying the gumming roller 143 are, by the action of the cam mechanism heretofore described, swung backwardly and downwardly, the roller 143 passing across the surface of the gumming die 117 which has in the meantime been swung downwardly, the gum being placed from the roller on the projecting portions 120 of the die. The gumming roller then swings back to its normal position, as shown in Fig. 4.

The gumming die is then swung upwardly against the pile of patches in the holder and its gummed surface adheres to the lowest patch in the pile and draws the same out of the holder past the projections 116 on the guides 115, which projections prevent more than one patch from being removed by the gumming die.

The gumming die 117, to the surface of which is adhering the patch, is swung downwardly until the guides 154, secured on a cross rod 155, pass in the slots 119 in the gumming die 117 and force the patch off the surface of the projecting portions 120 of the gumming die 117 while the patch is being grasped by the gripping roller 93 and its interior mechanism, in a manner which will now be described.

Figure 7:
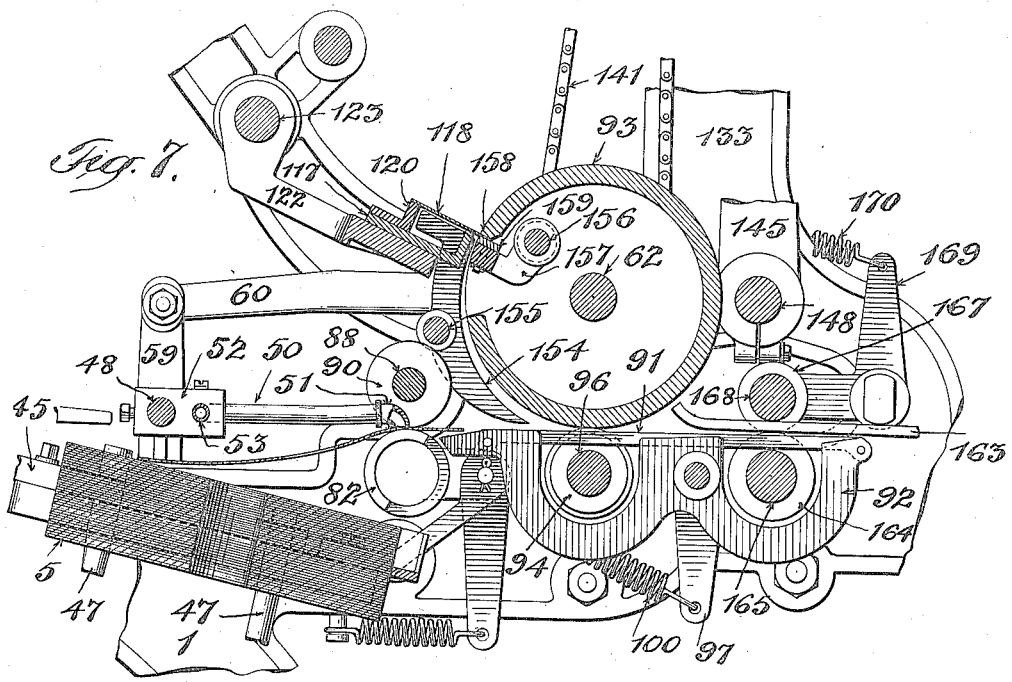
Fig. 7 is a side elevation, partly in section, of the blank transferring and patch applying mechanism.
Figure 8:
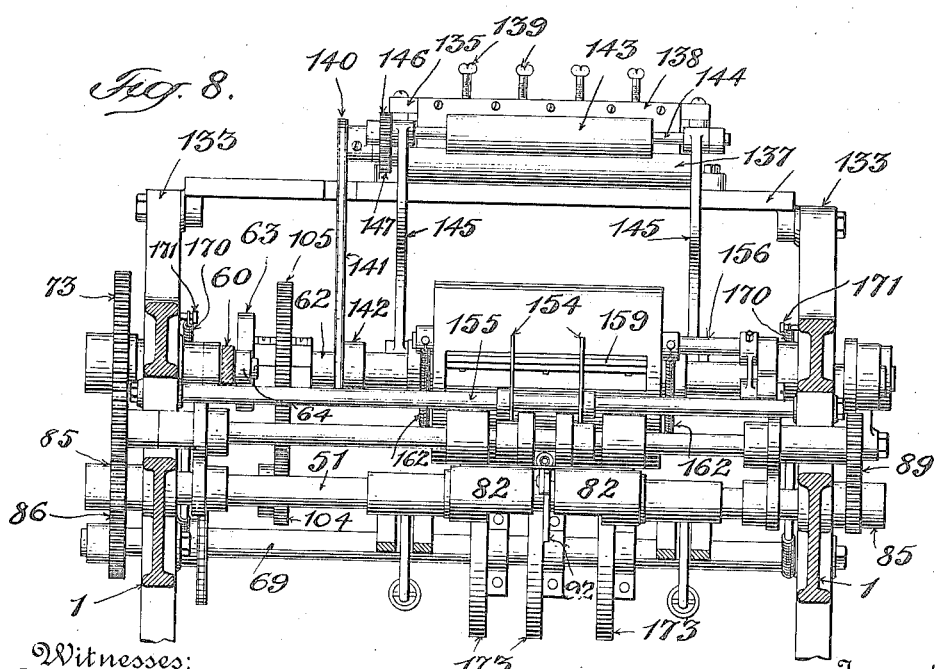
Fig. 8 is a vertical sectional elevation of the front portion of the machine showing the gumming mechanism.
Figure 21:
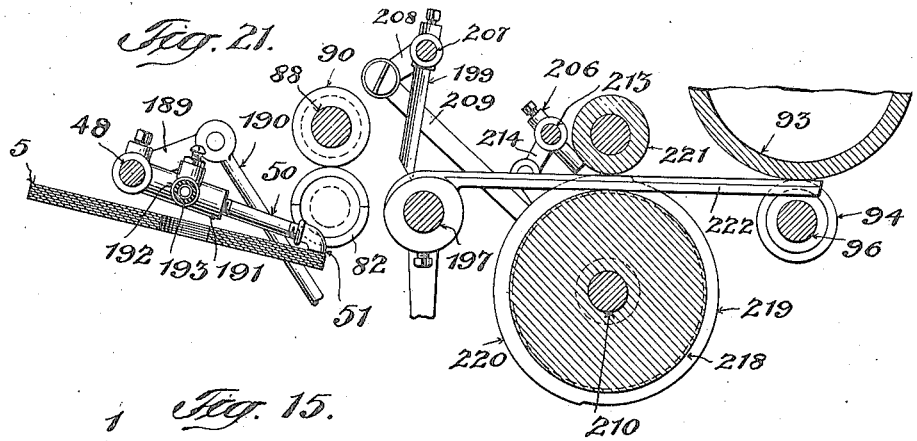
Fig. 21 is a sectional elevation of the modified mechanism for moving the envelop blank through the machine.

Extending longitudinally through the gripping roller 93, is a shaft 156 and mounted on said shaft 156 is a gripping jaw 157, which jaw coacts with one edge 158 of the slot formed in the gripping roller 93 to grip the patch as shown in Fig. 7, which is forced off the surface of the gumming die 117 in the manner heretofore described. The movable jaw 157 is operated by a cam mechanism consisting of a fixed cam 159 secured on a bushing 159$^a$ in which the shaft 62 rotates and this cam 159 engages a roller 160, on an arm 161 secured to the shaft 156. Springs 162 secured to the shaft 156 and to the ends of the roller 93, hold the roller 160 to the edge of the cam 159.

The jaw 157 coacting with the edge 158 of the gripping roller 93 grasps the patch 118 as indicated in Fig. 7, by the projections 163 formed on its edge which extend out beyond the edge of the gumming die and carries the said patch downward with it until the patch reaches the point which the envelop blank has reached in its forward movement through the rollers in the manner heretofore described. The forward movement of the envelop blank is timed so that when the blank reaches a point directly in front of the roller 93 and the pressing roller 94 the patch is carried down by the roller 93 and when the patch and envelop blank pass between the rollers 93 and 94, which is the point where the patch and blank are pressed together, the patch is situated directly over the opening 103 in the envelop blank. By increasing or decreasing the forward movement of the envelop blank, the patch can be caused to be placed over an opening situated at any point desired in the blank.

After the patch and blank have been pressed together between the rollers 93 and 94, they are passed forward from said rollers between the guide 91 and upper guides 163 and thence between a lower pressing roller 164, mounted on the shaft 165 which shaft is driven by a gear 166 secured on one of its ends which gear 166 meshes with the idle gear 66 which is in turn driven in the manner heretofore described, and an upper roller 167.

The roller 167 is secured on a shaft 168 which shaft is supported at its ends by bell crank levers 169 pivoted to the sides of the frame. Secured to the vertically extending arms of the bell crank levers are springs 170 which extend to pins 171 secured to the frame.

Secured on one end of the shaft 168 is a gear 172 which meshes with the gear 166 and is driven thereby in the manner heretofore set forth.

After the envelop blank, with its attached patch, has passed between the rollers 164 and 167, which rollers serve to again press the patch and blank together, it moves forward over a series of rollers 173, secured on the shaft 69, which shaft is driven by a sprocket 70 and chain 72 as before set forth. Curved guides 174 are secured to the guides 163 and these guides 174 follow the curvature of the rollers 173 and cause the envelop blank to follow the rotation of the rollers 173 and out of the machine. A roller 175 is mounted above the rollers 173 and rests thereon, and is mounted on a shaft 176 supported at its ends by arms 177 which are supported by the brackets 178.

After the completed envelop blank has passed between the rollers 173 and 175, it drops down on the outwardly extending rods 179 secured at their inner ends on a cross rod 180 extending between the sides of the frame.

On an oscillating shaft 181 situated below the cross rod 180 are secured arms 182, which arms pass, on their rearward movement, between the rollers 173. Secured on the shaft 181 is a downwardly extending lever 183, to the lower end of which is pivotally secured a rod 184, the end of which has a yoke 184$^a$ which embraces the main shaft 39. A roller 185 is mounted on the yoke 184$^a$ and this roller rides on a cam 186 secured on the main shaft. Secured to one of the arms of the yoke 184$^a$ is a spring 187, which extends to one of the guide bars 10 where its other end is secured. This spring 187 holds the roller 185 against the cam 186 at all times.

Before an envelop blank has dropped from between the rollers 173 and 175 the arms 182 have, by the action of the mechanism just described, swung backwardly between the rollers 173 and when the envelop blank drops down on the rods 179 the arms 182 swing outwardly and force the completed envelop blank against the stop 188, as shown in Fig. 4, which stop is adjustable on these rods 179 to accommodate the patched blanks.

In case it is desired to stop the patch gummer and picker from removing patches from the patch holder without stopping the running of the machine, I provide arms 200 which extend outwardly from the brackets 80. These arms have suitable stops 201 and 202 secured thereon. Connecting the brackets 80 is a shaft 203 at one end of which is a suitable handle 204 for manually oscillating said shaft 203. Secured on the shaft is a suitable projection such as a screw 205. When it is desired to prevent the patch picker from gumming and removing patches from the patch holder, the handle 204 is swung against the stop 202 which causes the projection 205, on the shaft 203, to move so that the arm 122 of the picker will, on its upward movement, contact with the projection 205 and thus be held away from the patches in the holder.

Figure 2:
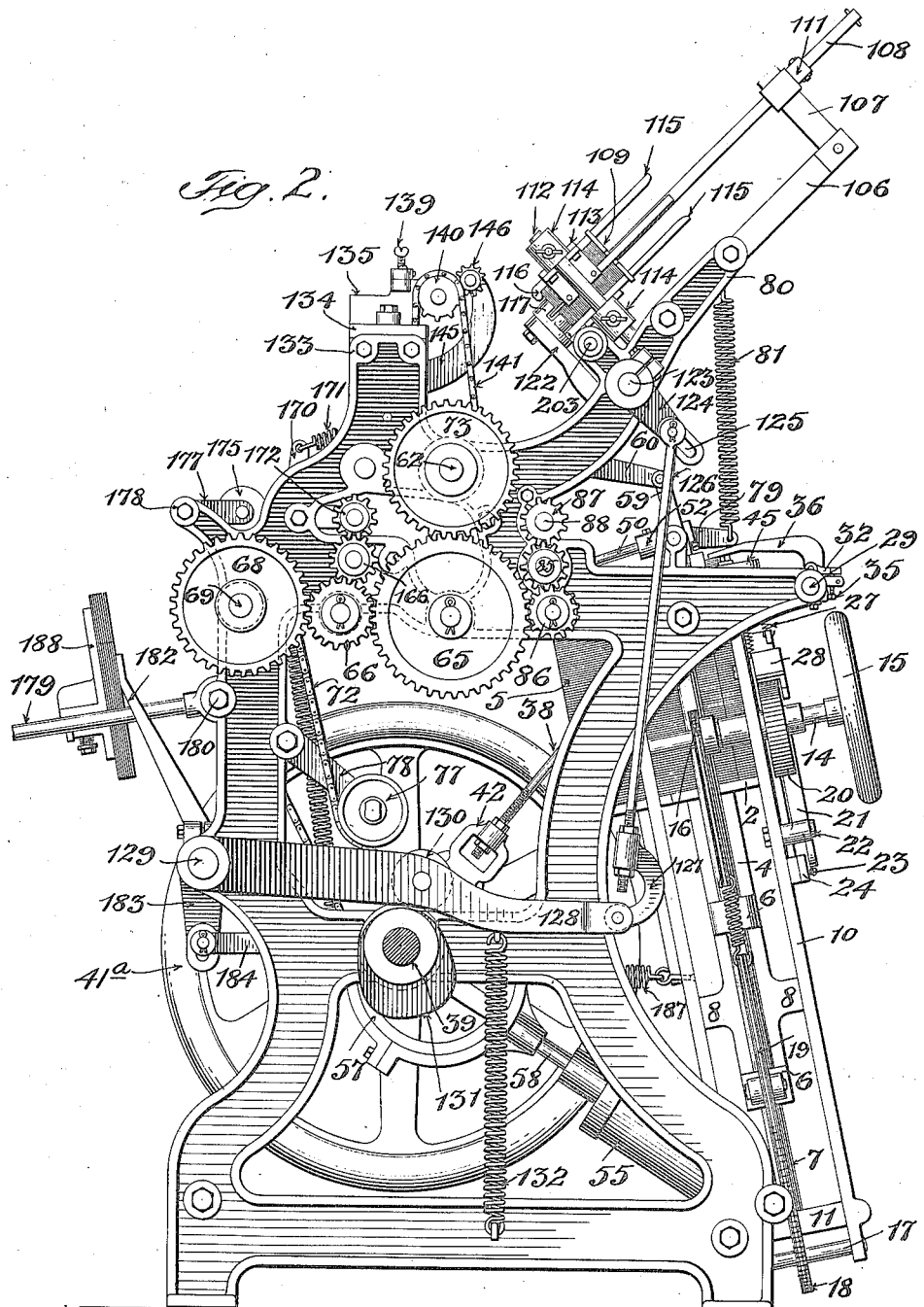
Fig. 2 is a side elevation of the same on the opposite side of the machine.
Figure 5:
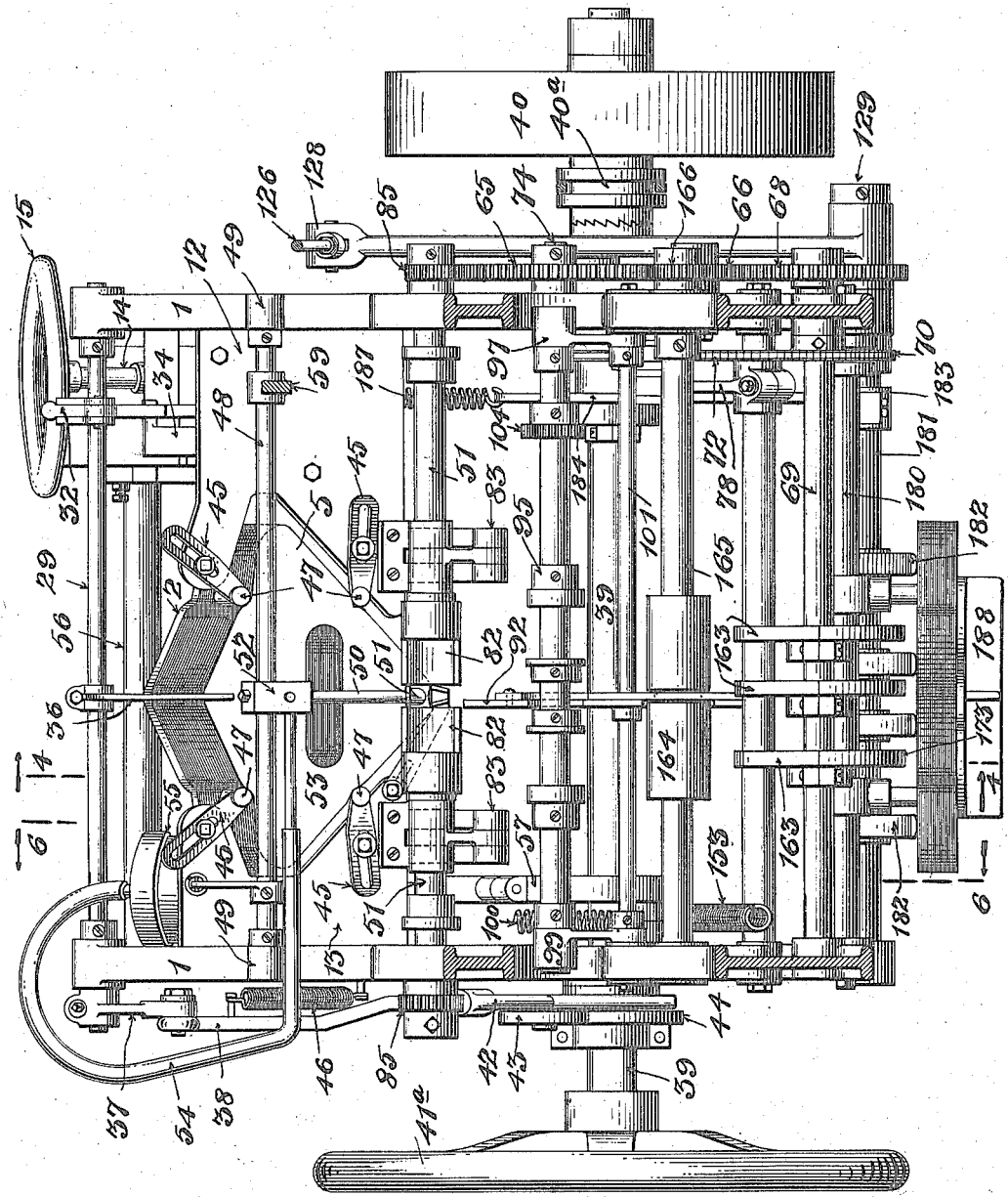
Fig. 5 is a sectional view on the line 5—5 of Fig. 3, looking in the direction of the arrows.

As the cam 131 which actuates the gummer is moving to the position shown in Fig. 2, with its highest point downward the decreased stroke is readily permitted.

In Figs. 15 to 26 inclusive, I have shown a number of modifications applicable to the machine heretofore described.

The blank lifter or picker tube 50 is mounted on the shaft 48 in the manner heretofore described. The shaft 48 has an arm 189 secured to it and pivotally secured to the outer end of said arm is a lever 190 which lever 190 extends downwardly to the main shaft 39 where it is actuated by suitable cam mechanism which gives the necessary oscillating motion to the shaft 48. The picker tube 50 is secured in a suitable connection 191 which is secured to the shaft 48 and which has a tubular extension 192 from one of its sides from which a tube 193 extends. This tube 193 is preferably made flexible to allow for the oscillating movement of the shaft 48 and the attached connection and picker tube 50. The tube 193 is connected to another tubular connection 194 which passes through the frame of the machine and on the outer side of the frame this connection connects with a tube 195 which extends downwardly to the pump 55 which forces the air through the aforementioned tubes and through the picker tube 50, to lift a blank in the manner heretofore mentioned.

The lifter or picker tube 50 lifts a blank in the manner heretofore described, to the split rollers 82 where it is grasped by said split rollers 82 and the roller 90 above the split roller, and between these rollers it is moved forward.

Figure 15:
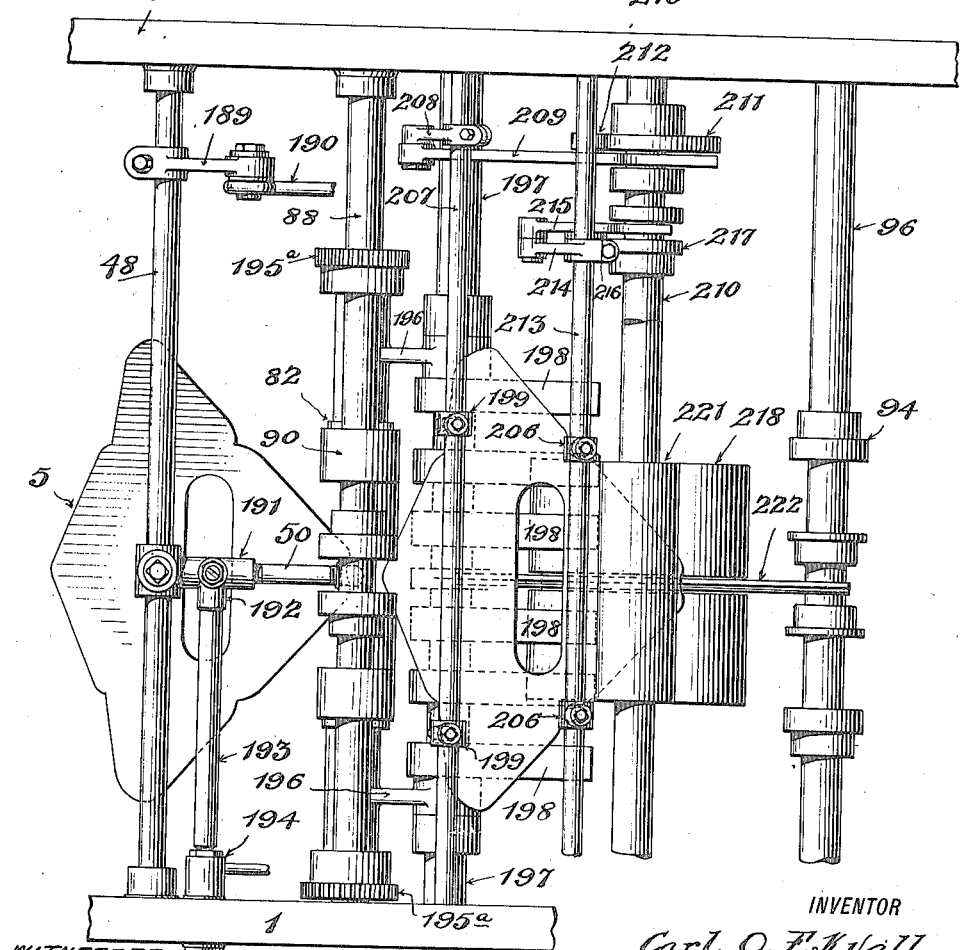
Fig. 15 is a plan of a portion of my machine as modified.

In the modification of my invention, as shown in Fig. 15, I have shown the roller 90, mounted on the shaft 88 and having gears 195ª which gears mesh with gears on the split roller 82 and drive said split roller, the shaft 88 being driven in any suitable manner from the main shaft. The split roller 82 is supported at its ends by the levers 196 which are secured on a shaft 197 extending across the machine which shaft 197 is secured in the side frames 1 of the machine.

A plurality of projecting guide plates 198 are secured on the shaft 197 and extend laterally therefrom. These projecting guide plates 198 form a table for the blank to rest on after it has passed between the rollers 82 and 90. When the blank reaches these guide plates 198, it is positioned or registered thereon by guides 199 and 206. The rearward guides 199 are secured on an oscillating shaft 207 extending transversely of the machine and to this shaft 207 is secured a lever 208, pivotally secured to a lever 209 which extends downwardly to a shaft 210, upon which is mounted a cam 211 upon which a roller 212, on the lever 209, rides whereby the shaft 207, with its attached guides 199 is oscillated. The guides 206 are oscillated in like manner, they being secured on a shaft 213 to which is secured the lever 214, which lever 214 is secured to the lever 215 having a roller 216 riding on a cam 217 secured on the shaft 210.

Secured on the shaft 210 and rotatable therewith, is a roller or cylinder 218 having an uneven surface. The shaft 210, which is driven in any desired manner, is timed so that when the blank reaches the guide plates 198 and is resting thereon, the low surface 219 of the cylinder 218, is uppermost and while the cylinder is rotating, the low surface does not tend to move the blank forward, so that the blank has a pause or dwell in its forward movement, during which pause or dwell it is being positioned on the guide plates 198 by the guides 199 and 206. By the time the blank is positioned by the guides 199 and 206, the high portion 220 of the cylinder 218 has moved uppermost and this portion 220 of the cylinder, coacting with the roller 221, above the cylinder, causes the blank to move forward on a guide 222, to the gripping roller 93 and the roller 94, where they apply the patch in the manner heretofore set forth.

In Figs. 23 to 26 inclusive, I have shown mechanism for automatically shutting off the air supply to the picker tube 50 whereby the picker is prevented from lifting blanks from the pile 5 in case of an accident to the mechanism, without stopping the machine. At 223 is a solenoid, supported in any suitable manner on the machine, and actuating a latch 223ª. A shaft 224 extends across the machine and is supported in any desired manner at its ends, as by the side members 1. Secured on one end of this shaft 224 is a sleeve 224ª from which extends a handle 225 for manually rotating the shaft 224. This sleeve 224ª has a recess 226 and extending in said recess is a projection or stud 227 formed on the side of the frame 1. This projection limits or restricts the oscillating movement of the shaft 224 by bearing against the ends of the recess 226 when the shaft 224 has been oscillated a certain distance. A sleeve 227ª is secured, by means of a screw 228, or other fastening means, to the shaft 224 and this sleeve 227 has a radially extending ear 229.

On the connection 194, heretofore described, is a rotatable sleeve 230 having a perforation 231. A bushing 232 is secured to the connection 194 and this bushing has a perforation 233 extending through its side. It will be noted that when the perforations 231 and 233 register with one another air forced or drawn from the pump 55 through the tube 195 will pass through the perforations 231 and 233. When the sleeve 230 is rotated so that it covers the opening 233 the air is forced or drawn by the pump directly through the connection 194 through the picker tube 50 which lifts the blank as before mentioned. Formed on the sleeve 230 is an ear 234 and connecting this ear 234 with the ear 229 on the sleeve 227$^a$ is a rod 235. It will be noted that a movement of the handle 225 will, by means of the mechanism just described, cause the perforations 231 and 233 to aline and disaline, allowing air to pass through the picker tube 50 and a patch lifted when desired.

For automatically causing a shutoff of the blank picker, I provide a pair of arms 236 formed on the sleeve 227$^a$ secured on the shaft 224. Slidably mounted in said arms is a latch 237 forced forward by a coil spring 238 extending between the arms 236 and surrounding the latch 237. This latch 237 engages the latch 223$^a$ actuated by the solenoid 223 which has wires 239 running to batteries or other power giving means.

Extending above the guide plates 198 is an arm 240 having a conductor 241 on its ends with wires 242 running to the batteries. A lever 243 is pivoted below the conductor. Should any of the blanks in passing over the guide plates 198 get crumpled or torn and not remain flat on the guide plates 198, they will contact with the lever 243 forcing the same pivotally upward against a screw 244 in the conductor 241 and thus closing the circuit which will cause the latch 223$^a$ to be drawn backward. A torsional spring 245 on the shaft 224 will cause said shaft to be rotated, so that the perforations 231 and 233 will register and the picker tube 50 prevented from lifting more blanks and clogging the mechanism.

I have shown the mechanism for closing the circuit placed above the guide plates 198. It is obvious that this mechanism can be placed at various places on the machine, so that when desired or by reason of any of the blanks not proceeding through the machine in the proper manner, the picker tube 50 will be, as before set forth, prevented from passing more blanks to the machine and clogging the mechanism.

In Figs. 16, 17, 18, 19, 20 and 22 I have shown the modified form of mechanism for supporting the patches and applying the same.

Brackets 246 one on each side of the machine, extend upwardly and support the patch holder. A plate 247 connects the two brackets 246 and supports the patch holding means. Extending upwardly from the plate 247 are a pair of rods 248 and slidable on these rods are plates 249 which plates are adjustable on the rods by the set screws 249$^a$. Secured to said plates 249 are a plurality of guides 250 which engage the pile of patches and hold the same. The upper guides 250 are toothed as at 251 so that in case of several patches adhering together while being removed from the patch holder by the gumming die, their edges bear against the teeth 251 which tends to separate them and allow only one patch to be removed at a time. A plurality of clips 252 are also secured to the plates 249 and hold the outer patch on the pile flat.

An oscillating shaft 253 connects the brackets 246 and secured to this shaft 253 is an arm 254 to the free end of which is secured a flat plate or head 255, adapted to, when the shaft 253 is oscillated, strike the outer patch in the holder and smooth or flatten the same so that the gummer will on its upward movement against this patch find the same held perfectly flat and smooth in the holder. The shaft 253 is oscillated by the following mechanism. An arm 256 is secured to said shaft and pivotally secured to the end of said arm 256 is a lever 257 extending downwardly to the shaft 62 upon which is secured a cam 258, upon which a roller 259, secured to the lever 257 rides, the lower end of the lever 257 having a yoke 260 embracing the shaft 62.

The plate 247 has a laterally extending portion 261 from the outer end of which extends an upright 262 through which slides a rod 263. This rod 263 has a plate or head 264 on one of its ends which bears against the rear of the patches in the holder. The rod 263 is toothed as at 265 adjacent its outer or free end and this toothed portion is engaged by a dog 266 pivotally mounted in the upper end of the upright 262 which prevents the rod 263 from moving backward when the plate 255, on the arm 254 strikes the front patch in the holder. In order that the head 264 on the end of the rod 263 can be continually caused to bear against the rear of the patches in spite of the fact that the patches are constantly being removed by the gumming die and picker, a weight 267 is suspended from a cord 268, which cord runs over pulleys 269 and 270 in the upright 271 and extends to a hook 272 on the rod 263.

The gumming die and picker 117, which is substantially the same as heretofore described, having the slots 119 and wall 120 is secured on the arm 273 which is secured on a transversely extending oscillating shaft 274. This shaft 274 is oscillated by the cam 131 on the main shaft which oscillates the lever 130 to which is secured the curved lever 127 and secured to this curved lever 127 and extending upwardly therefrom is the rod 126 which, in the modification of my invention shown in Figs. 17 and 19, is pivotally secured to a lever 275 on which is the segmental gear 276 which meshes with a gear 277 on the shaft 274 and oscillates said shaft.

Mounted on the shaft 274 is an arm 278 having a recess 279 in its end. In a block 280 on the plate 247 is secured a rod 281 and surrounding said rod, at its outer or free end, is a coil spring 282. A plate 283 is slidable on the rod 281 behind the spring and when the shaft 274 oscillates so that the gumming die with the patch carried by it is swung downwardly, the arm 278 bears against the plate 283 and against the pressure of the spring 282 so that the movement of the gumming die is steady and without vibration. A stop 284 on the rod 281 restricts the rearward spreading of the spring 282.

From the foregoing, it is obvious that my invention is not to be restricted to the exact embodiments herein shown but is broad enough to cover all structures coming within the scope of the annexed claims.

What I claim is:—

1. In an envelop machine, the combination with an envelop blank table, of mechanism for lifting a blank from said table, mechanism for receiving said blank from the blank lifting mechanism and propelling the same, a patch container, mechanism for applying gum to a patch in said container and then lifting the patch therefrom, mechanism for receiving the patch from the gumming mechanism and applying the same to the blank during the movement of said blank.

2. In an envelop machine, the combination with an envelop blank table, of a picker for lifting a blank from said table, mechanism for moving said blank away from the table, a patch holder, an oscillating gummer for gumming a patch in the holder and removing the gummed patch therefrom, gripping mechanism for receiving the patch from the gummer and carrying the same to a roller for applying said patch to the blank.

3. In an envelop machine, the combination with an envelop blank table, of a picker for lifting a blank from said table, rollers for moving the lifted blank away from said table, a patch holder, an oscillating gummer for applying gum to a patch while held in said holder and removing the gummed patch therefrom, strippers for stripping the gummed patch from the gummer and mechanism for gripping said gummed patch and carrying the same to means for applying the same to the blank.

4. In an envelop machine, the combination with a blank table, of mechanism for lifting a blank from said table, mechanism for moving said blank away from said table, a patch holder, an oscillating gummer for gumming a patch while held in said holder and then removing said gummed patch therefrom, a rotating cylinder, a gripping jaw in said cylinder coacting with means on the cylinder to receive the gummed patch from the gummer and means coöperating with said cylinder for applying said patch to the blank while said blank is moving forward.

5. In an envelop machine, the combination with a blank table, of mechanism for lifting a blank from said table, mechanism for moving said lifted blank, a patch holder, a gummer for gumming a patch in said holder and removing the same therefrom, a rotating cylinder, said cylinder having an opening, a gripping jaw in said cylinder coacting with one edge of the opening to grasp the gummed patch, strippers for forcing said gummed patch off the gummer and a roller beneath the cylinder coacting with said cylinder to apply the patch to the blank.

6. In an envelop machine, the combination with a blank table, of mechanism for lifting a blank from said table, a rotating cylinder, mechanism for moving the lifted blank to said cylinder, an oscillating patch gummer for gumming a patch and transferring the same to the cylinder, means on the cylinder for gripping said gummed patch and a roller beneath said cylinder for coacting with the cylinder for applying the gummed patch to the blank.

7. In an envelop machine the combination with a blank table, with blank lifting mechanism for lifting a blank from said table, mechanism for receiving said blank from the blank lifting mechanism, a patch holder, an oscillating patch gummer for gumming a patch in said holder and removing the same therefrom, a roller for applying gum to a patch, a gripping roller for receiving the gummed patch from the gummer and coöperating with another roller to apply the gummed said patch to the blank.

8. In an envelop machine, the combination with a blank table, of blank lifting mechanism, a pair of rollers for receiving and moving a lifted blank, a patch holder, a gumming die adapted to apply gum to a patch in said holder, a gum box, an oscillating gumming roller adapted to move across the face of the gumming die and apply gum thereto, a gripping roller for gripping a gummed patch, previously gummed by the gumming die, another roller, said gripping roller adapted to coact with said roller to apply the patch to the blank while said blank is moving between said rollers.

9. In an envelop machine, the combination with a blank table, of mechanism for lifting a blank from said table, rollers for moving said lifted blank away from the blank table, a patch holder above said table, an oscillating gumming die adapted to gum a patch while held in said holder, strippers for stripping said gummed patch from the gumming die, a pair of rollers, gripping means on one of said rollers for grasping the gummed patch, the patch being applied by said rollers to said blank while passing between the same.

10. In an envelop machine, the combination with a blank table, of a suction tube for lifting a blank from said table, a split roller for supporting said lifted blank and coacting with another roller for moving said blank away from said blank table, a patch holder, a gumming die for gumming a patch while held in said holder and removing said patch therefrom, a slotted roller, a gripping jaw carried thereby and coacting with one edge of the slot in said roller to grip a patch and remove the same from the gumming die and rollers for applying the patch to the blank and a support for the finished blanks.

11. In an envelop machine, the combination with a movable blank table, of a suction tube for lifting a blank therefrom, mechanism for oscillating said tube, a pair of rollers for moving the lifted blank, a patch holder, an oscillating patch gummer and mechanism for oscillating said gummer, a roller, said roller having a slot, a gripping jaw in said roller coacting with the edge of said slot to grasp a gummed patch on the gummer, means for forcing said patch from said gummer and rollers for applying the patch to the blank.

12. In an envelop machine, the combination with a blank table, of a suction tube for lifting a blank from said table, rollers for receiving and moving said lifted blank, a slotted oscillating patch gummer for gumming a patch and carrying the same, strippers for passing through the slots in said gummer and forcing the patch off the same, a roller for receiving the gummed patch and other rollers for applying the patch to the blank.

13. In an envelop machine, an oscillating patch gummer comprising a plate having a ledge upon which gum adheres for application to a patch said gummer having transverse slots extending from one of the longitudinal sides of the ledge to the other longitudinal side of the ledge and stationary strippers entering said slots to strip a gummed patch from the gummer.

14. In an envelop machine, the combination with envelop blank holding means, of mechanism for removing a blank from said blank holding means, patch holding means, mechanism for gumming and removing a patch from said patch holding means, a rotating cylinder adapted to receive a patch from said gummer, a gripper within said cylinder and coöperating with said cylinder for gripping a patch, cam mechanism for actuating said gripper, a roller coacting with said cylinder for applying the patch to the blank and other rollers for pressing and ironing said patch on the blank and moving the same out of the machine.

15. In an envelop machine, a blank table, mechanism for lifting a blank from said table, mechanism for moving said blank, a patch holder, an oscillating patch gummer having a ledge for forming a line of gum adjacent the edge of a patch, said gummer having a plurality of slots, strippers adapted to enter said slots and strip a gummed patch therefrom, gripping mechanism for gripping said gummed patch as it is stripped from the gummer and mechanism for applying said patch to the blank.

16. In an envelop machine, the combination with a vertically movable blank table, of an oscillating shaft above said table and mechanism for oscillating said shaft, a suction tube secured on said shaft and adapted to lift a blank from the table, a pair of rollers for receiving the blank lifted by the suction tube and moving the same forward, a slotted rotating cylinder, and another roller, said cylinder and roller adapted to coöperate to apply a patch to a blank moved between them by the rollers, a jaw contained within said cylinder for coöperating with the slot in the cylinder to grasp a patch, and mechanism on the outside of said cylinder for causing said jaw to grip or release a patch at the proper time.

17. In an envelop machine, the combination with a blank table, of an oscillating shaft above said table, means on said shaft for lifting a blank from said table, a pair of rollers for moving the lifted blank, a rotating shaft, a slotted cylinder and another roller, said roller and cylinder coöperating to apply a patch to a blank moved forward by the rollers secured on said rotating shaft, a jaw within the cylinder mounted on a shaft, to coöperate with an edge of the slot to grip a patch, an arm on the shaft upon which the jaw is mounted, a roller on said arm co-acting with a fixed cam to actuate said jaw.

18. In an envelop machine, a patch holder, an oscillating patch gummer having a plurality of slots and a ledge for forming a line of gum adjacent the edge of a patch, patch gripping mechanism adapted to coöperate with said gummer and a plurality of strippers intermediate the patch gummer and patch gripping mechanism adapted to enter the slots in the patch gummer and force the patch therefrom whereby the same may be gripped by the patch gripping mechanism.

19. In an envelop machine, a blank table, mechanism for lifting a blank from said table and mechanism for propelling said blank, a patch holder, an oscillating patch gummer for gumming a patch in the holder and removing the same therefrom, said gummer being slotted and having a ledge about its edge to apply a line of gum to a patch, a rotating cylinder, mechanism within said cylinder coöperating with the same to grip a patch removed by the patch gummer and held thereon, a plurality of strippers adapted to enter the slots in the patch gummer and force the patch off said gummer so that said patch can be gripped by the gripping cylinder and a roller coöperating with the cylinder to apply the patch to the blank fed thereto by said propelling mechanism.

20. In an envelop machine, a blank table, mechanism for lifting a blank from said table and mechanism for propelling said blank, an oscillating patch gummer and mechanism for actuating the same, a gum box, an oscillating gum roller for applying gum to the patch gummer, a slotted rotating cylinder, an oscillating jaw within said cylinder, for coöperating with the edge of the slot in the cylinder to grip a gummed patch held on the gummer, strippers intermediate the cylinder and patch gummer for stripping the gummed patch from the patch gummer whereby said patch may be gripped by the cylinder and jaw within the same and carried thereby, a roller beneath the cylinder for applying the patch to the blank fed thereto by said propelling mechanism, and other rollers for pressing the blank and applied patch and propelling the same out of the machine.

21. In an envelop machine, the combination with a blank table, of means for lifting a blank from said table, a split roller, a roller above said split roller co-acting with the same to move the lifted blank away from the blank table, a patch holder, a gummer for applying gum to a patch while held in said holder and removing the gummed patch therefrom, an oscillating gum applying roller for applying gum to the patch gummer before the same applies gum to the patch, mechanism for receiving said gummed patch from the gummer and a roller for co-acting with said mechanism for applying the patch to the blank fed thereto by said first mentioned rollers.

22. In an envelop machine, the combination with a blank table, of means for lifting a blank from said table, a split roller, a roller above said split roller co-acting with the same to move the lifted blank away from the blank table, a patch holder, a gummer for applying gum to a patch while held in said holder and removing the same therefrom, an oscillating gum-applying roller for applying gum to the patch gummer before the same contacts with the patch to which the gum is to be applied, a rotating cylinder having a slot, a jaw in said cylinder, movable to coöperate with one edge of said slot to grip a gummed patch held on the gummer, mechanism for causing said jaw and cylinder to grasp or release a patch at the proper time and a roller beneath the cylinder for co-acting with said cylinder to apply the patch to the blank fed thereto by said first mentioned rollers.

23. In an envelop machine, a blank table, an oscillating blank picker mounted above said table and adapted to engage the uppermost blank on the pile adjacent one of its ends and lift that end of the blank, a split roller co-acting with another roller to engage the lifted end of the blank and propel the same, patch supplying mechanism and mechanism for gumming the patches supplied thereby, situated above the blank table, blank propelling means and means for applying the patch to the blank while said blank is being propelled through the machine.

24. In an envelop machine, a vertically adjustable envelop blank table, an oscillating envolp blank picker, mechanism for automatically raising said blank table vertically so that the uppermost blank on said table will be engaged by the blank picker on its downward movement and lifted from the table on its upward movement, a split roller and a roller mounted above said split roller for propelling the lifted blank, a patch holder mounted above the blank propelling mechanism, an oscillating patch gummer and picker, cam mechanism for actuating the same, a gum receptacle, an oscillating gum roller for removing gum therefrom and applying the same to the patch gummer, a patch gripping cylinder adapted to receive a patch from said gummer, a movable jaw within the cylinder co-acting with the same to grip a gummed patch, strippers for removing the gummed patch from the gummer so that said gummed patch can be grasped by the cylinder and jaw and rotated with the cylinder, a roller beneath the cylinder co-acting with said cylinder, to apply the patch to the blank and other rollers for pressing the blank and attached patch and propelling the same out of the machine.

25. In an envelop machine, a patch holder and a patch gummer, movable to and from the patch holder, a shaft between the gummer and patch holder, a projection on said shaft and means whereby said shaft may be rotated so that the gummer will, on its movement toward the patch holder, strike said projection and be prevented from contacting with the patches in the holder.

26. In an envelop machine, a patch holder and an oscillating patch gummer, a transversely extending shaft intermediate the gummer and patch holder, a projection on said shaft and a handle on said shaft for oscillating the same so that the gummer on 27. In an envelop machine, a patch holder, a slidable rod extending from the rear of the patch holder and having a head adapted to bear against the rear of the patches in said holder, a bracket in which the said rod slides, a toothed surface on said rod, a dog mounted in the bracket and engaging said toothed surface to prevent backward movement of the rod and a movable weight connected to the rod whereby the head on the rod is kept in contact with the rear of the patches in the holder.

28. In an envelop machine, a main rotatable shaft, a blank table, an oscillating blank picker driven from said shaft, a pair of rollers driven from said shaft for moving a lifted blank, a rotating cylinder, mechanism within said cylinder for grasping a patch, a patch container, a patch gummer for gumming a patch in said container and removing the gummed patch from said container to the rotating cylinder, means on the main shaft for oscillating the patch gummer and a pair of rollers for pressing the blank and patch applied thereto by said first mentioned rollers.

Signed at the city, county and State of New York, this 14th day of June, 1916.

CARL O. EKVALL.

its upward movement will contact with the projection and be held away from the patches in the holder.